United States Patent [11] 3,618,532

| [72] | Inventors | Merle E. Clewett<br>Bushey Heath;<br>James A. Cornish, Isleworth, both of England |
|---|---|---|
| [21] | Appl. No. | 833,369 |
| [22] | Filed | June 16, 1969 |
| [45] | Patented | Nov. 9, 1971 |
| [73] | Assignee | American Can & Cable Company, Inc.<br>New York, N.Y. |

[54] CONVEYOR SYSTEM
6 Claims, 9 Drawing Figs.
[52] U.S. Cl. .................................................. 104/172 S, 104/96
[51] Int. Cl. ...................................................... B65g 17/42, B61j 1/12
[50] Field of Search ............................................ 104/172 S, 96, 103

[56] References Cited
UNITED STATES PATENTS
3,451,352  6/1969  Curry et al. .................... 104/172

*Primary Examiner*—Arthur L. La Point
*Assistant Examiner*—Robert Saifer
*Attorney*—Barnes, Kisselle, Raisch & Choate ABSTRACT: A conveyor system including a first load supporting track and a second load supporting track with an intermediate transfer portion. A powered conveyor is provided in association with the first and second tracks. A plurality of carriers are provided. Each of the carriers has a first dog that is in position for normal engagement with the pusher member of the conveyor and a second dog that is normally not in carrier pushing position. Means are provided at the transfer portion for moving the second dog into carrier transferring position.

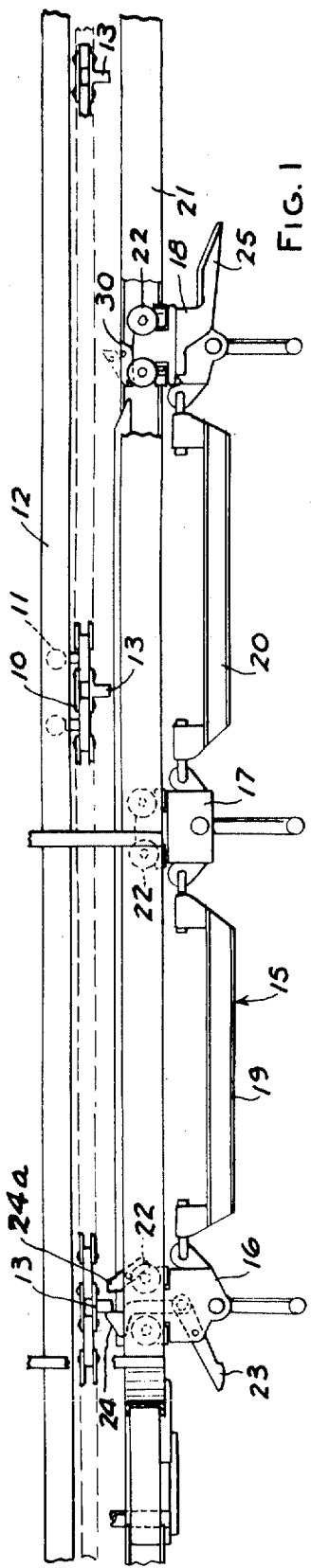
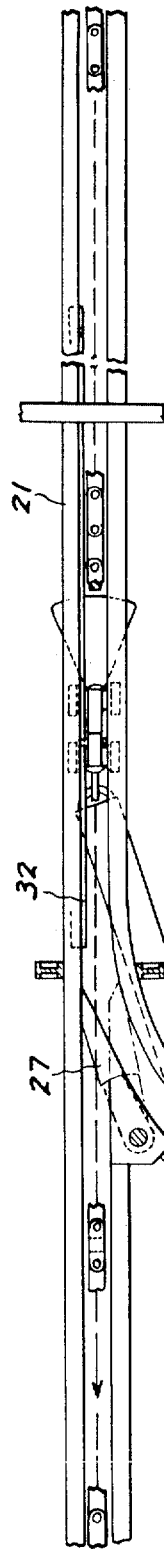
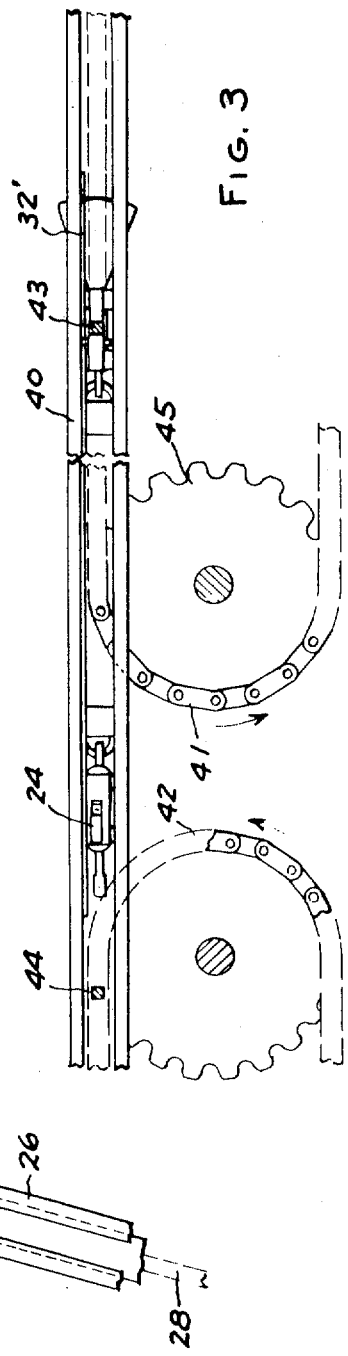

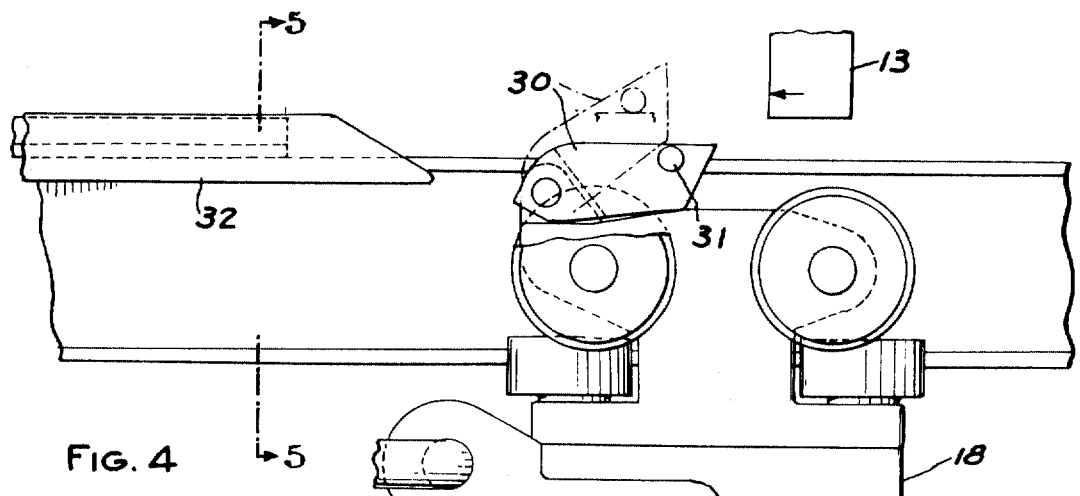
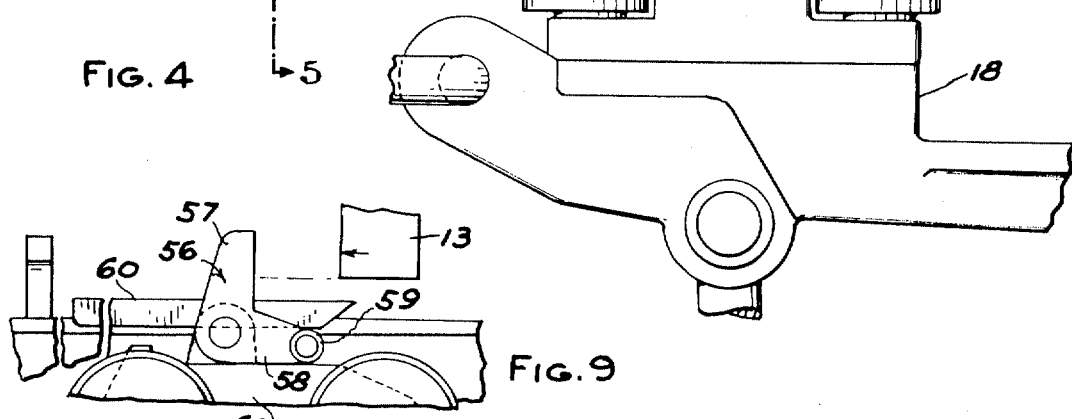
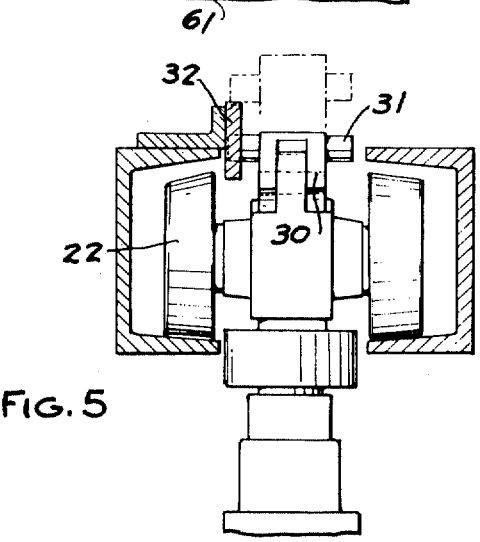
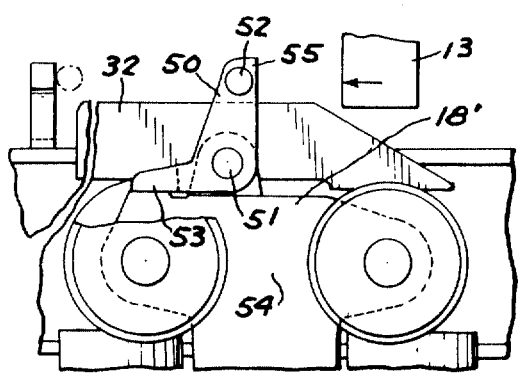
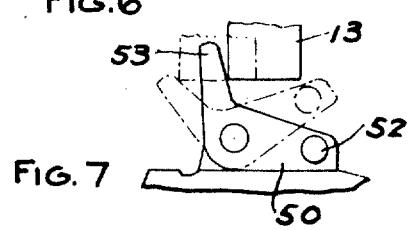
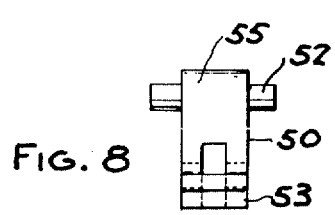

CONVEYOR SYSTEM

This invention relates to conveyor systems and particularly to power and free conveyor systems.

In power and free conveyor systems wherein carriers are moved along predetermined paths by engagement with conveyors, it is often necessary to transfer the carriers from one predetermined path to another. In one type of system, this transfer is achieved by providing a transfer conveyor that engages the carrier and transfers it between the predetermined paths. In another type of system, the carrier is moved from the one path toward the other and then pushed through the transfer area to the second path.

Among the objects of the present invention are to provide a power and free conveyor system of the latter type wherein a carrier is transferred from one predetermined path to another by pushing across a transfer zone; and wherein such system is achieved with minimum cost and maintenance.

SUMMARY OF THE INVENTION

A conveyor system including a first load supporting track and a second load supporting track with an intermediate transfer portion. A powered conveyor is provided in association with the first and second tracks. A plurality of carriers are provided. Each of the carriers has a first dog that is in position for normal engagement with the pusher member of the conveyor and a second pusher dog that is normally not in carrier pushing position. Means are provided at the transfer portion for moving the second pusher dog into carrier transferring position.

DESCRIPTION OF THE DRAWINGS

FIG. 1 is a fragmentary side elevational view of a conveyor system embodying the invention.

FIG. 2 is a fragmentary plan view of the system.

FIG. 3 is a fragmentary plan view of a modified form of conveyor system.

FIG. 4 is a fragmentary elevational view on an enlarged scale of a portion of the system shown in FIG. 1.

FIG. 5 is a fragmentary sectional view taken along the line 5–5 in FIG. 4.

FIG. 6 is a fragmentary side elevational view of a modified form of the invention.

FIG. 7 is a fragmentary view similar to FIG. 6 showing the parts in a different operative position.

FIG. 8 is a fragmentary front elevational view of a portion of the system shown in FIGS. 6 and 7.

FIG. 9 is a fragmentary side elevational view of a further modified form of the invention.

DESCRIPTION

Referring to FIG. 1, the invention relates to a conveyor system wherein a power chain is adapted to selectively engage trolleys and move them in predetermined paths. Specifically, conveyor chain 10 is supported by chain trolleys 11 for movement along a track 12. The chain 10 includes longitudinally spaced pushers 13 that are adapted to engage carriers, as presently described, to move them. As shown, a carrier 15 comprising longitudinally spaced trolleys 16, 17, 18 interconnected by tie bars 19, 20 is provided for movement along a track 21. The trolleys include wheels 22 that engage the spaced channels of track 21 (FIG. 5). The foremost trolley 16 includes an actuating lever 23 that is operatively connected to a pusher dog 24 so that when lever 23 engages an obstacle or a projection 25 on the rear trolley 18 of a preceding carrier, the lever 23 is swung clockwise as viewed in FIG. 1 to lower the pusher dog 24 out of the path of a pusher 13. Such an arrangement is known as an accumulating conveyor system. The foremost trolley 16 further includes a pivoted hold-back dog 24a in accordance with conventional practice.

As further shown in FIG. 2, the system includes a second track 26 that extends at an angle from the track 21 and a switch tongue 27 that is operated to guide the carrier 15 into the second track 26. The switch tongue 27 is controlled by signal devices such as are well known in the art, for example, as shown in the Bishop U.S. Pat. No. 2,868,139. A second power chain 28 is provided in overlying relation to a portion of the track 26 and is adapted to pick up the carrier and move it along the track 26.

Referring more specifically to FIG. 4, a succeeding trolley 18 of the carrier 15 includes a pivoted pusher dog 30 that is normally in the solid line position shown in FIG. 4, namely, out of the path of pushers 13. However, in the case of the transfer of the carrier from the track 21 to the track 26 by positioning of the switch tongue 27, the second pusher dog 30 is adapted to be moved to the dotted line position shown in FIG. 4 and thereby be in position for engagement with a pusher 13 which will push the carrier 15 through the switching or transfer area into position for engagement of the leading power dog 24 with the pusher of a secondary chain 28 along second track 26.

When the switch tongue 27 is actuated to divert the carrier, the pusher 13 which is in engagement with the pusher dog 24 will disengage from the pusher dog 24 as the foremost trolley 16 of carrier 15 is diverted to the track 26. The carrier 15 will then be momentarily stopped. However, by this time, the pusher dog 30 will have been moved upwardly by engagement of a transverse pin 31 thereon with a fixed cam 32 so that a succeeding pusher 13 of the power chain will engage the pusher dog 30 and cause the carrier 15 to be moved further along the track 26 sufficiently to be picked up by a pusher of the second power chain 28.

As shown in FIG. 2, the cam 32 extends along one side of the track 21 in the area preceding the switch tongue 27, that is, preceding the transfer.

Throughout the portion of the system wherein the transfer is achieved, the relative positions vertically of the power track 12 and carrier tracks 21, 26 remain constant and are not changed.

The invention is also applicable to the transfer of the carrier from one powered conveyor to another, for example, from a faster to a slower conveyor or from a slower conveyor to a faster conveyor. Specifically, as shown in FIG. 3, the carrier is adapted to move along a track 40 in a portion between spaced power conveyors 41, 42, each of which has pushers 43, 44. As the conveyor 41 moves over its sprocket 45, the pusher 13 thereon which is in engagement with the pusher dog 24 of the carrier becomes disengaged interrupting or causing a stoppage of the carrier. At this point, cam 32' along the track has cammed the second pusher dog 30 of the carrier upwardly into the path of a succeeding pusher 43 which then pushes the carrier across the gap between the conveyors 41, 42 bringing the leading pusher dog 24 into position for engagement with a pusher 44 of the succeeding conveyor 42. As the carrier is pulled across the space between the conveyors 41, 42, the second pusher dog 30 becomes disengaged from the cam 32' and drops by its own weight to the lower position such as shown in FIG. 4.

A modified form of the invention is shown in FIGS. 6–8 wherein the second dog on the rear trolley 18' comprises an L-shaped element 50 which is pivoted intermediate its ends by a pin 51. Dog 50 includes a cross pin 52 on one leg which normally counterweights the dog to the solid line position as shown in FIG. 7. In this position, any pusher 13 of the conveyor overtaking the carrier will merely pivot the pusher dog 50 to the broken line position and pass thereover. However, in the transfer area, the cam 32 along the track will cam the secondary pusher dog 50 to the position shown in FIG. 6 where it is held for engagement by a pusher 13. In this position, the leg 53 engages the body 54 to prevent further counterclockwise pivotal movement so that the pusher 13 will move the body of the trolley 18' and, in turn, the carrier. In this position, the other leg 55 forms the pusher portion and is engaged by the pusher 13.

In the modified form of the invention as shown in FIG. 9, the L-shaped element 56 has a pusher leg 57 and another leg 58 which forms a counterweight that normally holds the pusher leg 57 in upright position. As in the form of the invention shown in FIGS. 6–8, any pusher 13 of the conveyor overtaking the carrier will merely pivot the element 56 and move past the element. In the transfer area, cam 60 along the track will engage roller 59 on leg 58 and hold the pusher leg 57 in upright position for engagement by the pusher 13 to move the rear trolley 61 and, in turn, the carrier.

We claim:

1. In a conveyor system, the combination comprising
   means defining a first load supporting track,
   a first conveyor having a portion thereof adjacent said track and including longitudinally spaced pusher members,
   a plurality of carriers which move along said track,
   each said carrier having a first pusher dog,
   each said carrier having a second pusher dog,
   said second pusher dog being movable to and from position where it may be engaged by a pusher member on the conveyor,
   said second pusher dog forming one leg of an L-shaped member and pivoted intermediate its ends to said carrier,
   the other of said legs of said L-shaped member abutting said body when said second pusher dog is in position for engagement with a pusher member,
   a second load supporting track,
   means for guiding said carrier between said first and second load supporting tracks,
   and cam means in the area of said last-mentioned means for holding said second pusher dog in position for engagement with a pusher member of the conveyor whereby when a carrier is moved to said intermediate transfer portion, a pusher member of said conveyor becomes disengaged from said first pusher dog and a succeeding pusher member engages said second dog to push said carrier across said intermediate transfer portion,
   said L-shaped member being counterweighted so that the second pusher dog is normally in the path of the pusher members on the conveyor and pivotable momentarily out of the path by passage of pusher members thereover,
   said L-shaped member having one leg thereof which is engaged by the cam means to prevent pivoting of the L-shaped member and to hold the pusher dog upwardly into the path of the pusher member on the conveyor.

2. The combination set forth in claim 1 wherein said other leg of said L-shaped member extends rearwardly and abuts said body when said second pusher dog is in position for engagement with a pusher member.

3. The combination set forth in claim 1 wherein said leg of said L-shaped member which is engaged by said cam means is rearward of said pivot of said L-shaped member to said carrier.

4. In a conveyor system, the combination comprising
   means defining a first overhead load supporting track,
   a first conveyor having a portion thereof adjacent said track and including longitudinally spaced pusher members,
   a plurality of carriers which move along said track,
   each said carrier having a first pusher dog,
   each said carrier having a second pusher dog,
   said second pusher dog being movable to and from position where it may be engaged by a pusher member on the conveyor,
   said second pusher dog being cammed into the path of said pusher members at transfers,
   said pusher dog forming one leg of an L-shaped member and pivoted intermediate its ends to said carrier,
   the other of said legs of said L-shaped member abutting said body when said second pusher dog is in position for engagement with a pusher member,
   a second overhead load supporting track,
   overhead means for guiding said carrier between said first and second load supporting tracks, and cam means in the area of said last-mentioned means for holding said second pusher dog in position for engagement with a pusher member of the conveyor whereby when a carrier is moved to said intermediate transfer portion, a pusher member of said conveyor becomes disengaged from said first pusher dog and a succeeding pusher member engages said second dog to push said carrier across said intermediate transfer portion,
   said L-shaped member being counterweighted so that the second pusher dog is normally in the path of the pusher members on the conveyor and pivotable momentarily out of the path by passage of pusher members thereover,
   said L-shaped member having one leg thereof which is engaged by the cam means to prevent pivoting of the L-shaped member and to hold the pusher dog upwardly into the path of the pusher member on the conveyor.

5. The combination set forth in claim 4 wherein said other leg of said L-shaped member which is engaged by said cam means is rearward of said pivot of said L-shaped member to said carrier.

6. The combination set forth in claim 4 wherein said other leg of said L-shaped member extends rearwardly and abuts said body when said second pusher dog is in position for engagement with a pusher member.

* * * * *